(12) United States Patent
Morrow

(10) Patent No.: US 7,522,601 B1
(45) Date of Patent: Apr. 21, 2009

(54) FILTERED ROUTER ALERT HOP-BY-HOP OPTION

(75) Inventor: Glenn Morrow, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 886 days.

(21) Appl. No.: 10/619,032

(22) Filed: Jul. 14, 2003

Related U.S. Application Data

(60) Provisional application No. 60/398,206, filed on Jul. 24, 2002.

(51) Int. Cl.
*H04L 12/56* (2006.01)

(52) U.S. Cl. ..................................... 370/392
(58) Field of Classification Search ................ 370/389, 370/351, 357, 352, 473, 392
See application file for complete search history.

(56) References Cited

U.S. PATENT DOCUMENTS

| | | | | |
|---|---|---|---|---|
| 6,480,489 | B1 * | 11/2002 | Muller et al. | 370/389 |
| 6,804,720 | B1 * | 10/2004 | Vilander et al. | 709/229 |
| 7,035,239 | B2 * | 4/2006 | McCann et al. | 370/335 |
| 7,124,205 | B2 * | 10/2006 | Craft et al. | 709/250 |
| 7,209,484 | B2 * | 4/2007 | Ohno et al. | 370/401 |
| 2003/0156582 | A1 * | 8/2003 | Belgaied et al. | 370/389 |
| 2005/0204058 | A1 * | 9/2005 | Philbrick et al. | 709/238 |

OTHER PUBLICATIONS

Leiner, B.; "RFC 1077: Critical Issues in High Bandwidth Networking;" Nov. 1988; Network Working Group.

Morrow, G.; "Internet Draft: Filtered-Router-Alert Hop by Hop Option;" Aug. 2002; IETF.

Morrow, G.; "Internet Draft: Filtered-Router-Alert Hop by Hop Option;" Jan. 2002; IETF.

Partridge, C.; A. Jackson; "RFC 2711: IPv6 Router Alert Option;" Oct. 1999; The Internet Society.

Yavatakar, B.; D. Pendarakis; R. Guerin; "A Framework for Policy-Based Admissin Control;" Jan. 2000; The Internet Society.

"RSVP Protocol"; 2003; www.networksorcery.com.

Fairhurst, G.; "Operation of a Router;" Jan. 10, 2001; www.erg.abdn.ac.uk.

Mannion, Paul and Ian Bartley; "Fastpath Processing in the Internet Core;" (unknown); Silicon & Software Systems.

Kayath, Sanjeev et. al.; Network Router Architecture; A Survey; EECS, University of Illinois, Chicago.

Makin, A (ed) et al; RFC 2208: Resource ReSerVation Protocol (RSVP) Version 1 Applicability Statement Some Guidelines on Deployment; Sep. 1997; IETF.

Berson, Steven; "RSVP Protocol Overview;" Mar. 5, 1999; www.isi.edu.

(Continued)

*Primary Examiner*—Anh-Vu H Ly
(74) *Attorney, Agent, or Firm*—Hemingway & Hansen, LLP; D. Scott Hemingway

(57) ABSTRACT

The present invention supports a filtered router flag value in an information packet for packet-based communication networks. The presence of the filtered router flag value identifies the information packet as possibly requiring a slow-path routing technique. The flag value could also identify the router type or conditions that actually require slow-path routing techniques. A router identifying the filtered router flag value will forward the information packet to the signal processor for slow-path processing. A router not finding the filtered router flag value will forward the information packet directly on the appropriate output for transmission onto the network.

19 Claims, 3 Drawing Sheets

OTHER PUBLICATIONS

Aukia, P. and N. Oy; "Quality of Service Based Routing;" 1996; www.tcm.hut.fi.

Murhuvelan, KP; "Router Design & Route Lookup Mechanisms in Next Generation Backbone Routers;" University of Kansas.

Katz, D.; "RFC 2113: IP Router Alert Option;" Feb. 1997; IETF.

Deering, S. and R. Hinden; RFC 2460: Internet Protocol Version 6 (IPv6) Specification; Dec. 1998; The Internet Society.

* cited by examiner

FILTERED ROUTER ALERT HOP-BY-HOP OPTION

RELATED APPLICATION DATA

This application is related to Provisional Patent Application Ser. No. 60/398,206 filed on Jul. 24, 2002, and priority is claimed for this earlier filing under 35 U.S.C. § 120. The Provisional patent application is also incorporated by reference into this utility patent application.

TECHNICAL FIELD OF THE INVENTION

A message protocol for identifying an information packet for increased inspection and handling.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocol and Packet-Based Communication

The Defense Department's communication protocol governing data transmission between different networks was called the Internet Protocol (IP) standard. The IP standard uses discrete information packets, sometimes called datagrams, to communicate between different computers and other devices and networks over the Internet. The IP standard has been widely adopted for the transmission of discrete information packets across network boundaries. In fact, most telecommunication networks operate using information packets to transmit data to linked communication devices. The IP standard or similar packet-based communication protocols govern communications on these networks as well as the Internet.

Packet-based communication protocols depend on destination and source address data found in an address header for routing over a communication network. This type of network is sometimes referred to as a packet-switched network, because each information packet's path through the network is controlled by switching or routing decisions based on the address data found in the packet's address header. For these types of communication networks, the communication protocols operate to establish an end-to-end connection using individual information packets or datagrams each following individually set routes. Since each information packet is individually routed over the network without a fixed path or route, these networks are also characterized as connectionless networks.

In a typical information packet-based communication scenario, data is transmitted from an originating communication device on a first network across a transmission medium to a destination communication device on a second network. During transmission, transit routers on the network process the information packet address header to route the individual information packets. After receipt at the destination device, the destination communication device decodes the transmitted information into the original information transmitted by the originating device according to the applicable communication protocol.

Addressing and Routing

A communication device operating on an information packet-based network is assigned a unique physical address. For IP-based networks, this address is referred to as an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network. Other addressing protocols use address headers and similar addressing mechanisms to route information packets.

A router is used to regulate the transmission of information packets into and out of the communication network. Routers interpret the logical address contained in information packet headers and direct the information packets to the intended destination. Information packets addressed between communication devices on the same network do not pass through a router on the boundary of the network, and as such, these information packets will not clutter the transmission lines outside the network. If data is addressed to a communication device outside the network, the router on the network boundary forwards the data onto the greater network.

Network communication protocols define how routers determine the transmission path through a network and across network boundaries. Routing decisions are based upon information in the address header and corresponding entries in a routing table maintained on the router. A routing table contains the information for a router to determine whether to accept an information packet on behalf of a device or pass the information packet onto another router.

Routing that involves processing at a router and then forwarding in a hop-by-hop manner from one router to the next is referred to as hop-by-hop routing. At each point in the routing path, the receiving or destination router processes the packet to compare the address header information to the routing table maintained on the router for the next hop to forward the information packet. The router then forwards the information packet to the appropriate router on the next hop determined by the topological data in the routing table.

Packet Processing

Some routers are comprised of two types of components. The first type of component is the network processor. Network processors handle the basic routing functions by quickly processing (sometimes called "parsing") address header information in the information packet and then forwarding the information packet to the next hop destination as specified by an address stored in a route cache entry in the processor. This lower-level processing and forwarding of an information packet is sometimes referred to as the "fast-path" processing.

The second type of component in a router is signaling processors. If an information packets header address is not found in the route cache, higher-level processing may be required for matching the address with the routing table and forwarding the packet from the signaling processor. Additionally, some information packets require more extensive processing due to security, quality of service, or other control functions that require processing and/or implementation prior to forwarding of the information packet. This higher-level processing and forwarding of information packets is sometimes referred to as the "slow-path" processing.

Increasingly, information packet processing demands are expanding as networks begin to adopt the IP protocol. There is a growing need to enable access edge to access edge signaling for ubiquitous mobility, poke holes in firewalls, agree on a common method of dynamic quality of service (QoS) semantics (both per-flow and aggregate), accommodate security mechanisms, and support topological updates. These additional needs and accompanying processing demands on a network require increased scrutiny and processing of information packets using the slow-path processing technique. Consequently, the speed of information packet trans-mission and efficiency of communication decreases on the network because of the slow-path processing required for information packets on a network. There is a need for a mechanism to segregate information packets requiring increased scrutiny in the signaling processor and information packets that can continue to be routed using the route cache of the network processor.

SUMMARY OF THE INVENTION

The present invention defines a filtered router alert hop-by-hop option associated with an information packet that designates the information packet as being of potential interest to the router requiring closer examination. The filtered router alert hop-by-hop option includes an identifier and a filtered router bitmap flag. The filtered router alert identifier informs the router that the information packet may require routing using the signaling processor.

The filtered router bitmap flag determines whether the transit router has a requirement for the data in the information packet and if the transit router must use the signaling processor. Information packets not having a filtered router alert hop-by-hop option identifier or a bitmap flag designating a requirement are processed and forwarded using the network processor.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
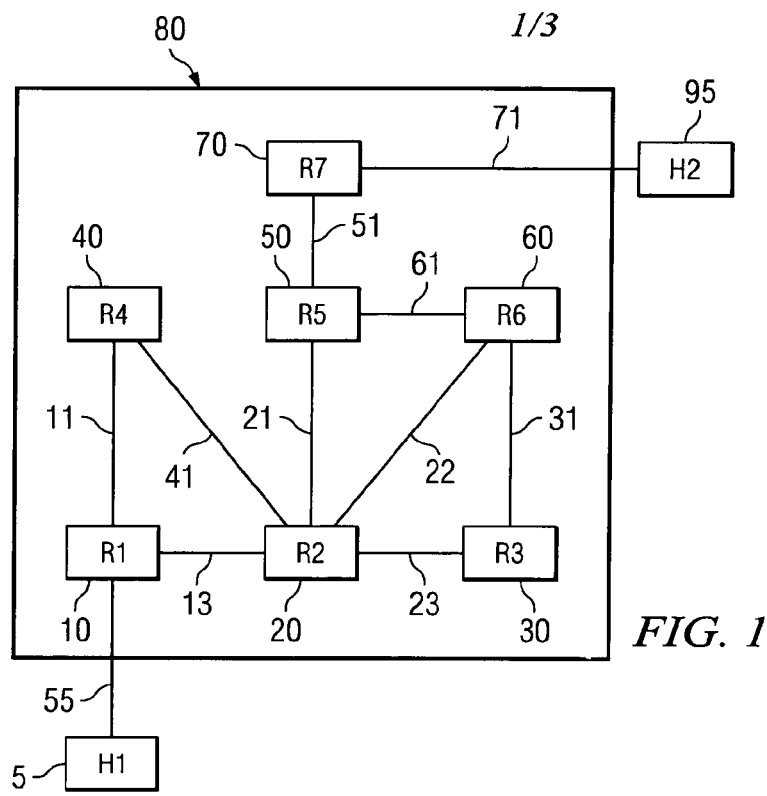
FIG. 1 is a schematic diagram of a packet-based communication system.

FIG. 1 is a schematic diagram of a packet-based communication system. Host 1 (H1) 5 is a computer, computer server, cellular phone, or other communication device linked to communication network 80 by communication link 55. Host 2 (H2) 95 is a computer, computer server, cellular phone, or other communication device linked to communication network 80 by communication link 71. In more general terms, Host 1 5 and Host 2 95 are nodes in a network. Nodes are connection points, either a redistribution point or an end point for data transmissions having a destination address corresponding to that assigned to the node. Nodes possess the capability to process and forward information packets to other nodes. Hosts and routers, in general terms, are both considered to be nodes.

The communication network 80 is comprised of seven routers with a current topology of communication links 11, 13, 21, 22, 23, 31, 61, 51, 55, and 71. Router 1 (R1) 10 is connected to Router 2 (R2) 20 by communication link 13 and to Router 4 (R4) 40 by communication link 11. Router 4 (R4) 40 is connected to Router 2 (R2) 20 by communication link 41. Router 2 (R2) 20 is connected to Router 5 (R5) 50 by communication link 21, to Router 6 (R6) 60 by communication link 22, and to Router 3 (R3) 30 by communication link 23. Router 3 (R3) 30 is connected to Router 6 (R6) 60 by communication link 31. Router 6 (R6) 60 is connected to Router 5 (R5) 50 by communication link 61. Router 5 (R5) 50 is connected to Router 7 (R7) 70 by communication link 71. H1 5 is linked to R1 10 by communication link 55, and H2 95 is linked to R7 70 by communication link 71. H1 5 and H2 95 can reside on the same network or different networks, and communication links 55 and 71 can include one or more intervening networks, including the Internet, or network 80 can be part of the Internet.

Each of the transit routers R1 10, R2 20, R3 30, R4 40, R5 50, R6 60, and R7 70 can use either fast-path or slow-path routing techniques. Typically, information packets received at a transit router are processed only using the fast-path to retrieve address header data. However, some information packets transiting network 80 require an increased level of examination to retrieve additional data and are processed using the slow-path technique. The use of the slow-path routing technique on every transit router significantly slows down transmission speed through network 80.

Figure 2:
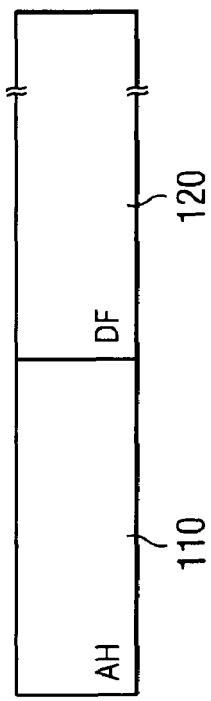
FIG. 2 is a general schematic diagram of an information packet used in packet-based communication systems.

FIG. 2 shows the general format of an information packet used in packet-based communication networks. Information packets use an encoding format of "1" and "0" data bits to build a data stream that a computer or other communication device can interpret. The information packet 100 has an address header (AH) 110 that provides routing instructions for transport over a packet-based communication system. The address header includes data for the destination device and the originating device. The actual length and configuration of the address header 110 (AH) is dependent on the actual communication protocol being used in a given network's protocol implementation (e.g. IPv4, IPv6, etc).

The information packet 100 also contains a variable length data field (DF) 120 that contains the actual information being transmitted from the originating device to the destination device. Address data in the address header 110 can be retrieved by routers using fast-path processing, but other data within the information packet may require retrieval by routers using the slow-path processing technique.

Figure 3:
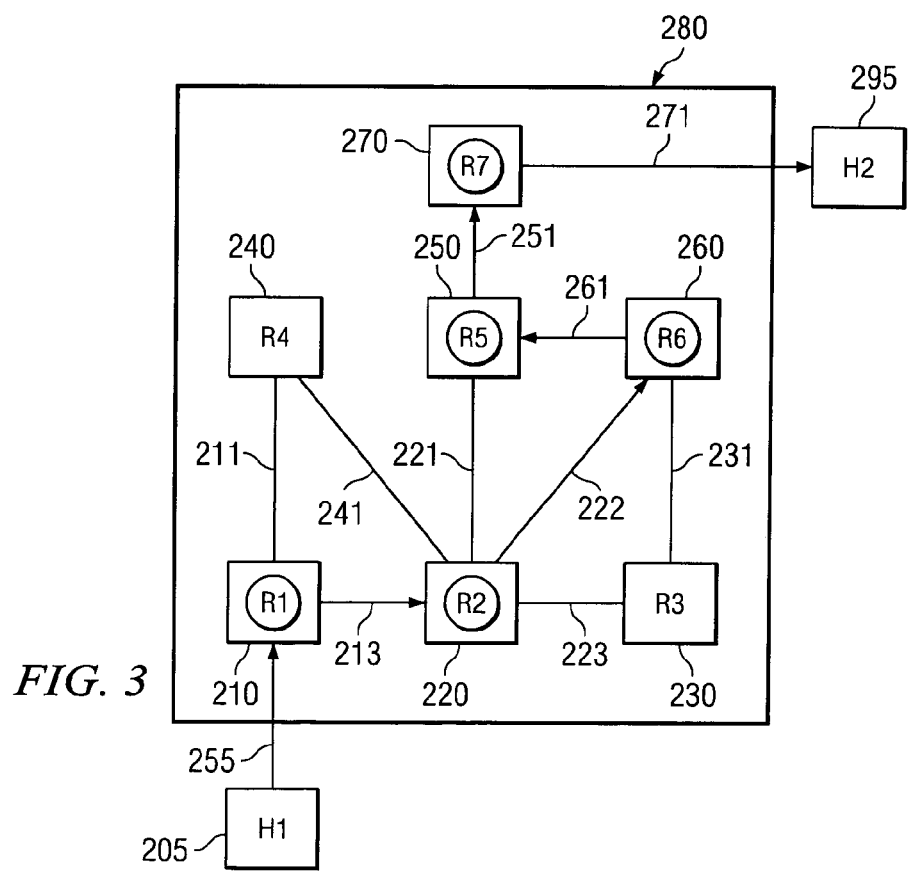
FIG. 3 is a schematic diagram of a packet-based communication system showing routing for an information packet using the prior art.

FIG. 3 shows the routing path for an information packet transmitted over a communication network from Host 1 (H1) 205 to Host 2 (H2) 295. H1 205 is a computer, computer server, cellular phone, or other communication device linked to communication network 280 by communication link 255. H2 295 is a computer, computer server, cellular phone, or other communication device linked to communication network 280 by communication link 271. Router 1 (R1) 210 is connected to Router 2 (R2) 220 by communication link 213 and to Router 4 (R4) 240 by communication link 211. Router 4 (R4) 240 is connected to Router 2 (R2) 220 by communication link 241. Router 2 (R2) 220 is connected to Router 5 (R5) 250 by communication link 221, to Router 6 (R6) 260 by communication link 222, and to Router 3 (R3) 230 by communication link 223. Router 3 (R3) 230 is connected to Router 6 (R6) 260 by communication link 231. Router 6 (R6) 260 is connected to Router 5 (R5) 250 by communication link 261. Router 5 (R5) 250 is connected to Router 7 (R7) 270 by communication link 271. H1 205 is linked to R1 210 by communication link 255, and H2 295 is linked to R7 270 by communication link 271.

An information packet transmitted from H1 205 to H2 295 is routed over the communication network 280 by a set of routers reflecting the current topological configuration of the network 280 and the most efficient and/or available path chosen for the packet by algorithms on each router during the hop-by-hop transmission.

If all of the network routers use the slow-path routing technique, the information packet is transmitted by link 255 from H1 205 to R1 210, where the packet is processed via the slow-path processing technique. From R1 210, the information packet is transmitted to R2 220 where it is routed via the slow-path processing technique. From R2 220, the information packet is forwarded to R6 260 where the packet is again processed via the slow-path processing technique on R6 260. The packet is then transmitted to R5 250 where the same slow-path processing technique is followed. From R5 250, the information packet is transmitted to R7 270 where the information packet is again processed using the slow-path processing technique before being forwarded to the destination address of H2 295.

All five transit routers use the slow-path processing technique even though only two routers (e.g. R2 220 and R6 260) may actually require the additional data in the information packet extracted by the slow-path processing technique. Compared to the transmission time if all five transit routers used the fast-path processing technique, the transmission time for the information packet over network 280 in FIG. 3 is increased considerably as all five transit routers use the slow-path processing technique.

Figure 4:
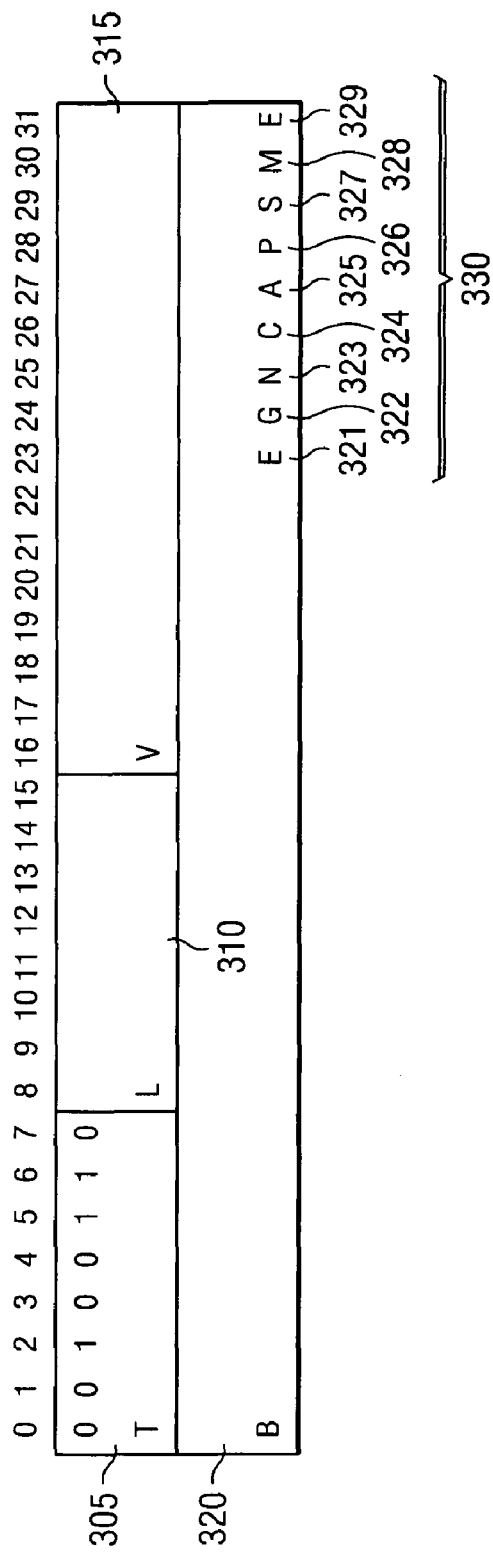
FIG. 4 is the preferred format for a filtered router alert hop-by-hop option for use in IP version 6 (IPv6)

FIG. 4 shows the format of an information packet for a filtered router alert hop-by-hop option of the invention for use with Internet Protocol version 6 (IPv6). A Protocol Data Unit (PDU) used in IPv6 incorporating the invention is defined. The PDU is comprised of 8-bytes (64-bits) of data organized into four data fields. The Option Type (T) data field 305 designates the type of PDU option. The value of the first two bits is "0". This indicates to routers that do not recognize the option to forward the information packet to the next hop. The next bit value "1" indicates that portions of the contents of this option are mutable. The value reflected by the final five bits in the Option Type field 305 designates the PDU as a Filtered Router Alert Hop-by-Hop Option (the value 6 is a suggested designated value only).

The next data field is the Option Length (L) data field 310 which specifies the length of the PDU in bytes. The Option Value (V) data field 315 is a two-byte long data field. The Option Value data field 315 designates the type of communication protocol (e.g. message and Resource Reservation Protocol (RSVP) message) and/or the functional reason for the alert. This Option Value field 315 is processed on the fast-path to indicate to the router what specific parts of the information packet to examine more closely. For example, the V field 315 may direct increased examination of both mobile binding information and bandwidth reservation information which are found in different portions of the same information packet. Examples of value indicators include indicators for an information packet containing a Path Directed—Encapsulating Security Payload (PD-ESP) header, a mobility header, a Multicast Listener Discovery Protocol (MLDP) request, and/or a resource request. The Option Value field 315 can also be used to statistically multiplex the packet to an embedded function or to some external process specifically designed to handle the particular piece of functionality.

The Bitmap (B) data field 320 is four bytes long and is integral of the present invention. The Bitmap data field 320 contains a set of filtered router bitmap flags that indicate the type of relevant data within the information packet. There are 32 available filtered router bitmap flags in B field 320. Nine bitmap flags (23-31) are defined for the B field 320, but additional flags are possible.

The "E" flag 321 switches the information packet to the slow-path for further inspection when the router being traversed is a Multi Protocol Label Switching (MPLS) label edge router. The "E" flag 321 is used to trigger requests in the MPLS signaling domain.

The "G" flag 322 switches the information packet to the slow-path for further inspection when the router being traversed is acting as a security gateway. The "G" flag 322 is used with nodes of a Virtual Private Network (VPN) for signaling with the security gateway when the exact address is not known or the discovery is deemed too inefficient.

The "N" flag 323 indicates slow-path processing for further inspection when the router being traversed is being used as a Network Address Translation (NAT) node. The "N" flag 323 is used by NAT administration tools as well as applications which require signaling for proper NAT traversal.

The "C" flag bit 324 indicates directing to the slow-path for further inspection when congestion or load threshold is detected on an interface. The "C" flag bit 324 is used by network analysis tools and traffic engineering applications.

The "A" flag bit 325 indicates directing to the slow-path when an aggregation function is provisioned for an interface. An example is a Wide Area Network (WAN) interface connecting multiple sites. The "A" flag 325 is used by network analysis tools and traffic engineering applications.

The "P" flag bit 326 switches the information packet to the slow-path for further inspection when a per-flow function is provisioned for an interface. Such an interface may exist between an over-provisioned Local Area Network (LAN) and WAN or any bandwidth-constrained shared link. The "P" flag bit 326 is used by network analysis tools and per-flow resource management.

The "S" flag bit 327 indicates slow-path routing on interfaces that entail a change in security keys. This bit flag may be used to indicate a difference in administrative domain ownership between peers or a downstream-upstream provider boundary. The links and interfaces between boundary routers of separate Border Gateway Protocol (BGP) autonomous systems are examples of where the "S" flag bit 327 is employed.

The "S" flag bit 327 is used by network layer functions that re-use the existing security associations and trust relationships set up between systems.

The "M" flag bit 328 indicates slow-path routing is requested for an information packet on an interface which constitutes a layer 3 mobility-enabled edge router. An example for such a router is one close to the mobile device performing local mobility management functions or a router closer to the correspondent performing mobility functions.

The "F" flag 329 is employed to switch the information packet to slow-path routing when the router is an interface configured to access control functions such as in conjunction with a firewall.

Routers that recognize this Filtered Router Alert Hop-by-Hop Option during fast-path routing will recognize the applicable bit flag and transmit the packet to the signal processor for examination of the bit flag. The network processor only needs to process the information packet in sufficient detail to determine whether the information packet contains data of interest to the router requiring more detailed examination and slow-path processing. The filter flags in the B field 320 provide a quick method during fast-path routing to determine the appropriate level of interest by the network processor based upon an examination of the filter flags. Once the network processor determines slow-path routing is requested, the information packet is forwarded onto the slow-path for more detailed examination and processing.

If the field values become corrupted during transmission, the router can mute the filter flag field. That is, the filter flags are mutable in that a network processor can ignore the filter flags after an integrity check shows some data corruption on the information packet. This mutability enhances the flexibility and scalability of applications using the Filtered Router Alert Hop-by-Hop Option.

Applications that can benefit from the Filtered Router Alert Hop-by-Hop Option include congestion avoidance mechanisms, communications with NAT and firewall devices, per-flow resource management, aggregate resource management, and network security association establishment.

Congestion avoidance mechanisms can benefit from the knowledge of congestion at specific interfaces. The "C" flag 324 can be used to detect, act on, and report on this congestion. Such tools can be used by network administrators to determine the points of congestion within networks on a real-time basis.

Some applications can benefit from knowledge of and communication with NAT or firewall devices. The "N" flag 323 and the "F" flag 329 can be used to facilitate signaling to these applications. Tools can also perform network analysis related to address translation technology.

Networks and applications can also benefit from a common method to signal per-flow resource management functions. The "P" flag 326 facilitates signaling per-flow resource management functions on interfaces performing aggregate resource management.

Network security imposes a growing requirement for network nodes to quickly exchange and cache shared secret keys and establish security associations with other nodes along a bearer path at varying levels of granularity. Current mechanisms for performing these functions force an unpredictable delay by having to either resort to using trusted authentication service or by exchanging keys dynamically on a per-use basis. This can cause an information packet to be queued while waiting for authorization and result in the stateful queuing of an information packet causing discontinuity in the flow (e.g. queue and wait) with arbitrary delay.

The "S" flag 327 allows key exchange and security associations to be established by leveraging the trust relationship and security associations of the routing system itself, facilitating the establishment of security associations between an arbitrary set of endpoints along a path using a single roundtrip message exchange. The PD-ESP value in conjunction with the "S" flag 327 can be used to establish this secure routing path for a communication.

Figure 5:
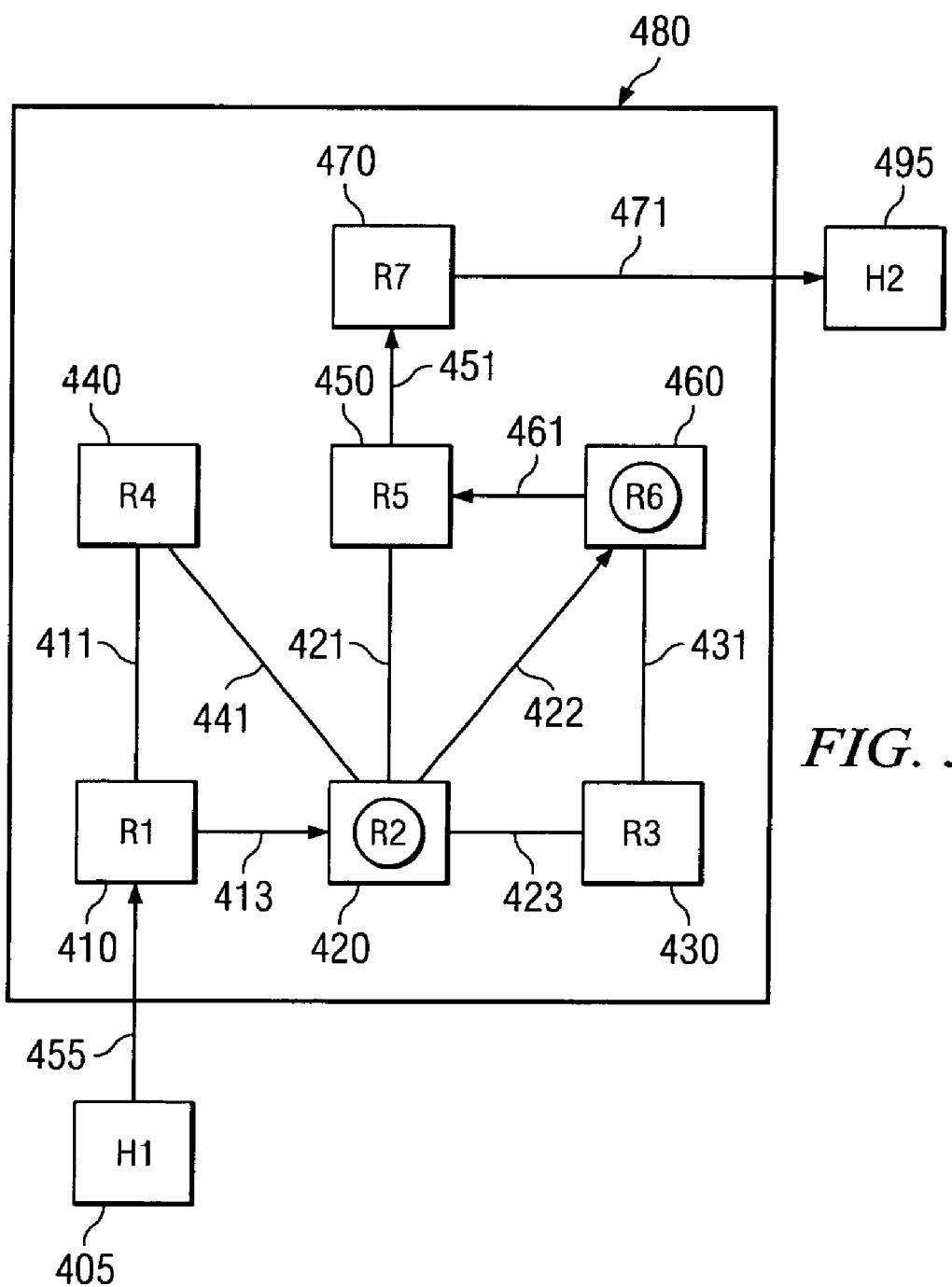
FIG. 5 is a schematic diagram of a packet-based communication system showing routing for an information packet using the invention.

FIG. 5 shows the routing path for an information packet transmitted over a communication network using the present invention. H1 405 is a computer, computer server, cellular phone, or other communication device linked to communication network 480 by communication link 455. H2 495 is a computer, computer server, cellular phone, or other communication device linked to communication network 480 by communication link 471. R1 410 is connected to R2 420 by communication link 413 and to R4 440 by communication link 411. R4 440 is connected to R2 420 by communication link 441. R2 420 is connected to R5 450 by communication link 421, to R6 460 by communication link 422, and to R3 430 by communication link 423. R3 430 is connected to R6 460 by communication link 431. R6 460 is connected to R5 450 by communication link 461. R5 450 is connected to R7 470 by communication link 471. H1 405 is linked to R1 410 by communication link 455, and H2 495 is linked to R7 470 by communication link 471. H1 405 and H2 495 can reside on the same network or different networks, and communication links 455 and 471 can include one or more intervening networks, including the Internet.

An information packet transmitted from H1 405 to H2 495 is routed over the communication network 480 by a set of transit routers reflecting the current topological configuration of the network 480 and the most efficient and/or available path chosen for the packet by algorithms on each router during the hop-by-hop transmission. Because of the network 480 service requirements, information packets are used to communicate data that is only recovered during slow-path routing of the information packet. In this example, data in the information packet found during slow-path routing is only needed in R2 420 and R6 460.

Using an information packet containing a Filtered Router Alert Hop-by-Hop Option, the information packet is transmitted from H1 405 to R1 410, where the packet is processed using the fast-path processing technique. R1 410 does not need slow-path processing, so none of the bitmap flags in the information packet match any of the flags in the provisioned data field on R1 410. Because slow-path processing is not requested, the fast-path processing technique is used in R1 410. The information packet is forwarded to R2 420 only using fast-path routing.

R2 420 requires slow-path processing for certain information packets. As the information packet is processed on router R2 420, the Filtered Router Alert Hop-by-Hop Option is encountered. The filtered router bitmap flags is compared to the provisioned data field on the router R2 420, which identifies the information packet as one that needs increased examination under slow-path processing by the signal processor. The information packet is then forwarded to the signal processor for slow-path processing.

After being examined and processed as required, the information packet is forwarded to R6 460. R6 460 also requires slow-path processing for certain information packets. The packet is examined and the Filtered Router Alert Hop-by-Hop Option is encountered, identifying the information packet as requiring increased examination and processing by the signal processor. The information packet is forwarded to the signal processor on R6 460 for use as defined by the bit flag values.

The information packet is then transmitted from R6 460 to R5 450 for further routing. Because R5 450 has no requirement for slow-path processing, none of the filtered router bitmap flags in the information packet match any of the flags in the provisioned data field on R5 450. The information packet is forwarded to R7 470, where it is again processed using the fast-path processing technique before forwarding to the destination address of H2 495.

As specified in the present invention, slow-path routing is selectively conducted on only routers R2 420 and R6 460 of the network. Instead of requiring slow-path routing on each of the five transit routers, only two of the five transit routers use slow-path routing techniques using the invention—and the other three transit routers continue to use fast-path routing techniques. By reducing the number of transit routers required to use the slow-path processing technique, the transit time over the network 480 is decreased considerably compared to the transit time found using all slow-path routing techniques.

While the invention has been particularly shown and described with respect to preferred embodiments, it will be readily understood that minor changes in the details of the invention may be made without departing from the spirit of the invention.

Having described the invention, I claim:

1. A packet-based communication network having different speed path-rated routing devices, comprising:
    at least one slow-path routing device on the network having one or more inputs that receive information packets on the network and one or more outputs that transmit information packets onto the network, an information packet containing a slow-path identifier if that information packet requires slow-path routing;
    said at least one slow-path routing device having a first processor coupled to said inputs and said outputs, said first processor parsing address header information in at least one of the information packets including examining one or more flag values in said at least one of the information packets and processing said at least one of the information packets according to slow-path routing techniques, and transmitting said at least one of the information packets to one of said outputs for directing to any other slow-path routing device on the network if said at least one of the information packets possesses the slow-path identifier;
    at least one fast-path routing device on the network having one or more inputs to receive information packets on the network, said at least one fast path routing device processing information packets not having the slow-path routing identifier and neither parsing header information nor analyzing said at least one of the information packets according to slow-path routing requirements,
    said slow-path identifier including flag value that indicates if the corresponding information packet should be forwarded to a slow-path routing device on the network.

2. The packet-based communication network of claim 1 wherein the slow-path identifier includes a flag value that contains a data element identifying a filtered router alert option.

3. The packet-based communication network of claim 1 wherein the slow-path identifier includes a flag value that identifies the type of data from an information packet to be processed by the slow-path routing devices on the network.

4. The packet-based communication network of claim 2 wherein the flag value identifies a slow-path routing device as an edge router.

5. The packet-based communication network of claim 2 wherein the flag value identifies a slow-path routing device as a gateway.

6. The packet-based communication network of claim 2 wherein the flag value identifies a slow-path routing device as an interface.

7. A method for routing an information packet on a packet-based communication network comprising the steps of:
    receiving an information packet on an input of a slow-path router, said slow-path router having a first processor performing slow-path processing;
    checking a slow-path identifier value in the information packet at the first processor to determine if the information packet requires slow-path processing on the first processor;
    analyzing the packet according to the slow-path routing requirements if the slow-path identifier value is a predetermined value;
    forwarding the information packet to an output on the slow-path router for transmission to any other slow-path routers on the network if the information packet has said slow-path identifier;
    receiving an information packet on an input of a fast-path router, said fast-path router having a second processor performing fast-path processing;
    checking a slow-path identifier value in the information packet at the second processor to determine if the information packet requires slow-path processing on the network;
    forwarding the information packet to an output on the fast-path router for transmission to any other slow-path routers on the network if the information packet has said slow-path identifier.

8. The method for routing an information packet on a packet-based communication network of claim 7 wherein the slow-path identifier value contains a data element identifying a filtered router alert option.

9. The method for routing an information packet on a packet-based communication network of claim 7 wherein the slow-path identifier value indicates the portions of an information packet that require processing at the second processor.

10. The method for routing an information packet on a packet-based communication network of claim 7 further comprising the step of:
    processing an information packet on an edge router.

11. The method for routing an information packet on a packet-based communication network of claim 7 further comprising the steps of:
    processing an information packet on a gateway.

12. The method for routing an information packet on a packet-based communication network of claim 7 further comprising the step of:
    processing an information packet on an interface.

13. The method for routing an information packet on a packet-based communication network of claim 7 further comprising the step of:
    processing an information packet for use by an application.

14. A method for routing an information packet on a packet-based communication network comprising the steps of:
    receiving an information packet on an input of a slow-path router;
    checking a slow-path identifier value in the information packet at a first processor in a slow-path router to determine if the information packet requires higher-level processing;

forwarding the information packet to an output on the slow-path router for transmission onto any other slow-path routers on the network if the slow-path identifier value indicates the need for higher-level processing by said slow-path routers; and retrieving specific control function data from the information packet during the higher-level processing.

15. The method for routing an information packet on a packet-based communication network of claim 14 wherein a slow-path identifier includes a type data field and a flag value data field.

16. The method for routing an information packet on a packet-based communication network of claim 14 comprising the step of:

forwarding the retrieved data for use on an interface.

17. The method for routing an information packet on a packet-based communication network of claim 14 further comprising the step of:

forwarding the retrieved data for use in an application.

18. The method for routing an information packet on a packet-based communication network of claim 14 further comprising the step of:

forwarding the retrieved data for use on a gateway.

19. The method for routing an information packet on a packet-based communication network of claim 14 further comprising the step of:

transmitting the retrieved data onto the network.

* * * * *